United States Patent
Kahn

(10) Patent No.: US 10,234,874 B2
(45) Date of Patent: Mar. 19, 2019

(54) AUTONOMOUS VEHICLE CONTROL SYSTEM

(71) Applicant: Elbit Systems Land and C4I Ltd., Netanya (IL)

(72) Inventor: Yair Kahn, Netanya (IL)

(73) Assignee: ELBIT SYSTEMS LAND AND C4I LTD. (IL)

( * ) Notice: Subject to any disclaimer, the term of this patent is extended or adjusted under 35 U.S.C. 154(b) by 0 days.

(21) Appl. No.: 15/751,097

(22) PCT Filed: Nov. 28, 2016

(86) PCT No.: PCT/IL2016/051271
§ 371 (c)(1),
(2) Date: Feb. 7, 2018

(87) PCT Pub. No.: WO2017/094000
PCT Pub. Date: Jun. 8, 2017

(65) Prior Publication Data
US 2018/0239367 A1   Aug. 23, 2018

Related U.S. Application Data

(60) Provisional application No. 62/416,717, filed on Nov. 3, 2016.

(30) Foreign Application Priority Data

Nov. 30, 2015   (IL) .......................................... 242858

(51) Int. Cl.
*G05D 1/10* (2006.01)
*B64C 39/02* (2006.01)
(Continued)

(52) U.S. Cl.
CPC ............ *G05D 1/101* (2013.01); *B64C 39/024* (2013.01); *G01S 5/0054* (2013.01); *G01S 13/06* (2013.01);
(Continued)

(58) Field of Classification Search
CPC ..... G05D 1/101; B64C 39/024; G08G 5/0069
See application file for complete search history.

(56) References Cited

U.S. PATENT DOCUMENTS 6,176,451 B1   1/2001   Drymon
6,955,324 B2  10/2005   Tanielian
(Continued)

FOREIGN PATENT DOCUMENTS

KR   2014/0046437   4/2015

OTHER PUBLICATIONS

Colin, Theodore et al., "Flight Trials of a Rotorcraft Unmanned Ariel Vehicle Landing Autonomously at Unprepared Sites", American Helicopter Society Inc., May 9-11, 2006.
(Continued)

*Primary Examiner* — Basil T. Jos
(74) *Attorney, Agent, or Firm* — Vedder Price P.C.

(57) ABSTRACT

A drone control system for controlling a drone which includes an onboard-flight-system previously configured to receive navigational-data in a format compliant with a standard navigational data transmission protocol. The system includes a remote-sensor and an interface. The remote sensor is located remotely from the drone and determines the position of the drone relative to the remote-sensor. The interface, coupled with the remote-sensor, produces a pseudo GPS signal indicating the position of the drone and to provide the pseudo GPS signal to an onboard-flight-system of the drone. The format of the pseudo GPS signal is fully compliant with the standard navigational data trans- (Continued)

mission protocol employed by the onboard-flight-system. The onboard-flight-system is receives inertial tracking data from an onboard inertial-measuring-unit and the pseudo GPS signal, and tracks the position of the drone by merging the inertial tracking data and the pseudo GPS signal and navigates the drone accordingly.

11 Claims, 2 Drawing Sheets

(51) Int. Cl.
    *G08G 5/00*     (2006.01)
    *G01S 15/06*     (2006.01)
    *G01S 13/06*     (2006.01)
    *G01S 5/00*     (2006.01)
    *G01S 19/03*     (2010.01)
    *G01S 19/11*     (2010.01)
    *G01S 19/48*     (2010.01)
    *G01S 19/49*     (2010.01)

(52) U.S. Cl.
    CPC .............. *G01S 15/06* (2013.01); *G01S 19/03* (2013.01); *G01S 19/11* (2013.01); *G01S 19/48* (2013.01); *G01S 19/49* (2013.01); *G08G 5/0069* (2013.01); *B64C 2201/027* (2013.01); *B64C 2201/14* (2013.01); *B64C 2201/145* (2013.01)

(56) References Cited

U.S. PATENT DOCUMENTS

| | | |
|---|---|---|
| 2010/0084513 A1 | 4/2010 | Gariepy et al. |
| 2014/0032021 A1 | 1/2014 | Metzler et al. |
| 2014/0195150 A1* | 7/2014 | Rios .................... B64C 39/024 |
| | | 701/469 |
| 2015/0131860 A1 | 5/2015 | Meloche et al. |
| 2015/0220085 A1 | 8/2015 | Ohtomo et al. |

OTHER PUBLICATIONS

Kong, Wei Wei et al., "Autonomous Landing of an UAV with a Ground-Based Actuated Infrared Stereo Vision System", 2003 IEEE/RSJ International Conference Intelligent Robots and Systems (IROS), Nov. 3-7, 2013, pp. 2963-2970, Tokyo, Japan.

* cited by examiner

AUTONOMOUS VEHICLE CONTROL SYSTEM

FIELD OF THE DISCLOSED TECHNIQUE

The disclosed technique relates to control systems for controlling autonomous vehicles, in general, and to control systems employing a remote position sensor for augmenting the onboard position sensors, in particular.

BACKGROUND OF THE DISCLOSED TECHNIQUE

Autonomous vehicle control systems, employing position data determined by a remote sensor located remotely from the vehicle, are known in the art. Reference is now made to US Patent Application Publications No. 2014/0163775, 2014/0032021 and 2014/0046589 all to Metzler et al. These publications describe a drone control system. The control system determines the position of the drone by employing a ground-based surveying device (e.g., a theodolite), and an onboard reflector. Accordingly, the control system flies the drone to a setpoint position. It is noted that the control system controls the drone, and is not interfacing with a native drone flight system. That is, the control system provides flight instructions to the drone. The dedicated control system might therefore be complicated and expensive, and is tailored for a specific drone model (i.e., is not easily adapted to different drones).

Reference is now made to US Patent Application Publication No. 2013/0206919, to Shachor et al. This publication describes a control system for an aerial unit. The control system determines the location of the aerial unit by employing a video camera. The control system generates location metadata indicative of position corrections for positioning the aerial unit at a desired location. As with the previous publications, the control system of this publication produces instructions for the aerial vehicle, and is not augmenting a native flight system.

Reference is now made to US Patent Application Publication No. 2010/0084513, to Gariepy et al. This publication describes a method for remotely controlling an aerial vehicle. The method involves providing a map of the environment and receiving target world coordinates for the aerial vehicle within the environment. A desired velocity vector to direct the aerial vehicle to the target world coordinates is determined. The desired velocity vector is configured to direct the aerial vehicle at a speed proportional to the distance between the aerial vehicle and the target world coordinates. The aerial vehicle is directed along the desired velocity vector until the aerial vehicle reaches the target world coordinates.

U.S. Patent Application Publication 2014/032021 to Metzler et al directs to a measuring system for controlling a self-propelled, unmanned aerial vehicle using a measuring unit. The position of the aerial vehicle is detected by a total station which emits light and can pivoted about two axes. As a result, the direction of the emission of light can be aligned with the aerial vehicle. Additionally, a distance measuring module in the total station, determines the distance of the aerial vehicle with the aid of a reflector on the aerial vehicle. The actual coordinates of the aerial vehicle can be determined from the measured angles and the distance. All measurement data can be transmitted to a control unit e.g. via cable or radio link, which control unit is situated in the total station in the aerial vehicle.

Reference is now made to FIG. 1, which is a schematic illustration of a drone, generally referenced 10, constructed and operative as known in the art. Drone 10 includes an onboard flight system 12, an inertial measurement unit 14 (IMU 14) and an onboard GPS sensor 16. Onboard flight system 12 is coupled with each of IMU 14 and onboard GPS sensor 16. Onboard flight system 12 receives inertial tracking data, tracking the position of drone 10, from IMU 14. Additionally, onboard flight system 12 receives GPS readings respective of the absolute position of drone 10 from onboard GPS sensor 16. Onboard flight system 12 merges the inertial tracking data with the GPS readings, and accordingly tracks the position of drone 10.

SUMMARY OF THE PRESENT DISCLOSED TECHNIQUE

It is an object of the disclosed technique to provide a novel system and method for controlling a drone. In accordance with the disclosed technique, there is thus provided a drone control system for controlling a drone. The onboard flight system is previously configured to receive navigational data in a format compliant with a standard navigational data transmission protocol. The drone control system includes a remote sensor and an interface with the remote sensor. The remote sensor is located remotely from the drone and configured to determine the position of the drone relative to the remote sensor. The interface is configured to produce a pseudo GPS signal indicating the position of the drone and to provide the pseudo GPS signal to an onboard flight system of the drone. The format of the pseudo GPS signal is fully compliant with the standard navigational data transmission protocol employed by the onboard flight system. The onboard flight system is further configured to receive inertial tracking data and the pseudo GPS signal. The onboard flight system is also configured to track the position of the drone by merging the inertial tracking data and the pseudo GPS signal and to navigate the drone accordingly. The onboard flight system receives the inertial tracking data from an onboard inertial measuring unit of the drone.

In accordance with another aspect of the disclosed technique, there is thus provided a drone control method for controlling a drone. The method includes the procedures of determining the position of the drone by a remote sensor and producing pseudo-GPS signal according to the position of the drone detected by the remote sensor. The method further includes the procedure of providing the pseudo-GPS signal to the drone onboard flight system via an interface.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a drone control system. The drone is equipped with an onboard flight system which determines the position of the drone by merging inertial tracking data and absolute position data. The control system of the disclosed technique accurately determines the drone absolute position and provides it to the onboard flight system. The control system may further provide a desired setpoint position for the drone to hover at, or a desired route for the drone to follow.

The drone control system of the disclosed technique includes a remote position sensor, and an interface coupled with the remote position sensor and with the native onboard flight system of the drone. The remote sensor determines the position of the drone relative to the remote sensor. The interface receives the drone position from the remote sensor and produces a pseudo-GPS signal indicating the absolute position of the drone. The interface interfaces with the onboard flight system and provides the pseudo-GPS signal to the onboard flight system. The onboard flight system merges the inertial tracking data with the pseudo-GPS signal, and accordingly tracks the current position of the drone. It is noted that, the position determined by the remote sensor, is substantially more accurate than GPS readings of an onboard GPS sensor. For example, the pseudo-GPS signal indicates the absolute position of the drone in an order of magnitude of centimeters, while a conventional native GPS sensor indicates the position of the drone in an order of magnitude of meters. Therefore, the control system of the disclosed technique allows for a highly accurate tracking and positioning of the drone.

Figure 1:
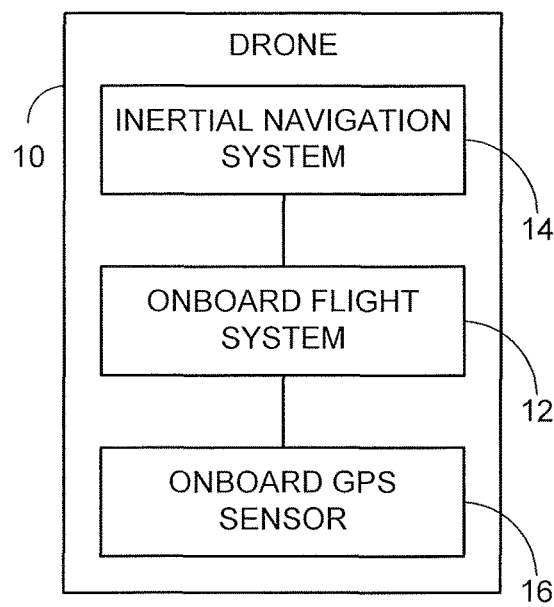
FIG. 1 is a schematic illustration of a drone constructed and operative as known in the art.
Figure 2:
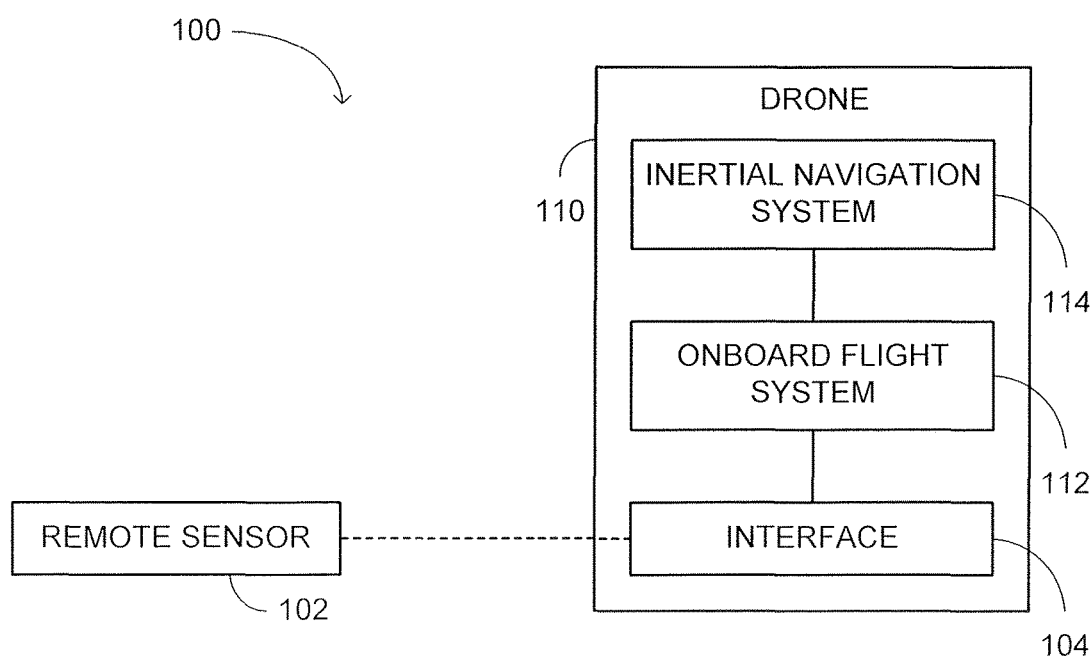
FIG. 2 is a schematic illustration of a drone control system, constructed and operative in accordance with an embodiment of the disclosed technique.

Reference is now made to FIG. 2, which is a schematic illustration of a drone control system, generally referenced 100, constructed and operative in accordance with an embodiment of the disclosed technique. Drone control system 100 includes a remote sensor 102 and an interface 104. Remote sensor 102 is coupled with interface 104. Interface 104 is further coupled to onboard flight system 112 of drone 110.

Remote sensor 102 can be any remote sensor for determining the position of the drone. For example, remote sensor 102 is a radar (e.g., ground based radar station or a vehicle mounted radar), a camera or cameras (e.g., IR cameras or stereoscopic cameras), an ultrasonic transceiver, a magnetic transceiver, a theodolite, and the like. Remote sensor 102 can include a plurality of sensors, of the same type, or different types, for improving position detection accuracy and for allowing position detection under various conditions (e.g., a radar, and a set of IR cameras for detecting the drone during bed weather conditions). Remote sensor 102 detects drone 110 as is, without modifying drone 110 for easing detection. Alternatively, remote sensor 102 employs a dedicated marker component mounted onboard drone 110, such as a metal slab (for easy radar detection), or a reflector (for easy visual detection).

In accordance with one embodiment of the disclosed technique, remote sensor 102 detects the relative position of drone 110 in a reference coordinate system. Such a reference coordinate system may be, for example, a relative coordinate system (i.e., relative to remote sensor 102 itself). In accordance with another embodiment, such a reference coordinate system may be an absolute coordinate system (e.g., WGS84). For example, remote sensor can detect the relative position of drone 110, in a relative coordinate system and can further determine its own location in an absolute coordinate system by employing a GPS sensor. Remote sensor 102 determines the absolute position of drone 110 from the relative position of drone 110 and the absolute position of remote sensor 102.

Interface 104 receives drone position data from remote sensor 102, produces accordingly a pseudo-GPS signal indicating the absolute position of the drone and provides the pseudo-GPS signal to drone onboard flight system 112. Thus, the pseudo-GPS signal replaces a GPS signal which would have been produced by an onboard GPS sensor. It is noted that the accuracy of the drone position indicated by the pseudo-GPS signal is higher than the accuracy of the onboard GPS sensor (e.g., centimeters Vs. meters). Interface 104 can include hardware components, software components or a combination or both. Interface 104 is physically connected with onboard flight system 112, replacing the conventional onboard GPS sensor.

Interface 104 formats the pseudo-GPS signal in the data format employed by onboard flight system 112. Therefore, onboard flight system 112 requires no modifications, and the control system of the disclosed technique can be employed for controlling conventional drones without having to modify the drones themselves. Additionally, the control system of the disclosed technique can easily be adapted to control various types of drones, as long as those drones have a native onboard flight system. In other words, remote sensor 102 provides the native onboard flight system 112 of the drone, via the interface 104, position information in the format in which native onboard flight system 112 operates. For example, the format of the pseudo GPS signal is fully compliant with the format of a known in the art standard navigational data transmission protocol (e.g., NMEA 0183 or UBX) employed by onboard flight system 112 (i.e., onboard flight system 112 has been previously configured to receive navigational information in a format compliant with such a standard navigational data transmission protocol).

In accordance with one embodiment of the disclosed technique, interface 104 receives from remote sensor 102 only relative position data, indicating the relative position of drone 110 relative to remote sensor 102. Interface 104 determines the absolute position of remote sensor 102, and accordingly determines the absolute position of drone 110. In case remote sensor 102 is immobile (e.g., a radar station), the absolute position of remote sensor 102 can be stored on interface 104. In case remote sensor 102 is mounted on a vehicle, an absolute position sensor (not shown) mounted on remote sensor 102 provides the absolute position of remote sensor 102 to interface 104. In accordance with an alternative embodiment, remote sensor 102 provides the absolute position of drone 110 to interface 104 For example, a processing component coupled with remote sensor 102 determines the absolute position of drone 110 from the relative position detected by remote sensor 102, and from the absolute position of remote sensor 102 itself. In either case, interface 104 translates the absolute position data (indicating the absolute position of drone 110) into a pseudo-GPS signal appropriate for onboard flight system 112.

Interface 104 provides the pseudo-GPS signal to onboard flight system 112, and can further provide a desired setpoint position, or a desired trajectory, to onboard flight system 112. Onboard flight system 112 navigates drone 110 to the desired setpoint, or along the desired route.

Onboard flight system 112 is the native flight system of drone 112, and is not a part of the system of the disclosed technique. Put another way, onboard flight system 112 does not require any modifications or adjustments for employing the control system of the disclosed technique. In a conventional manner, as known in the art, onboard flight system 112 receives inertial tracking data from inertial measurement unit 114 (IMU 114) and GPS readings from an onboard GPS sensor, and merges the data for tracking the position of drone 110. The system of the disclosed technique replaces the GPS readings of the onboard GPS sensor with the pseudo-GPS signal produced by interface 104.

The pseudo-GPS signal is a GPS signal indicating the absolute position of drone 110, as detected by remote sensor 102 (or as inferred from the relative position detected by remote sensor 102). The pseudo-GPS signal is in the format employed by onboard flight system 112, and thus onboard flight system 112 does not require modifications (i.e., and is not "aware" of the fact that the GPS signal is provided by interface 106 and not by the onboard GPS sensor).

The position accuracy of remote sensor 102 is higher than that of a GPS onboard sensor of drone 110. Thereby, by substituting the GPS readings of the onboard sensor, with the more accurate measurements of remote sensor 102, the tracking accuracy of onboard flight system 112 is improved. On the other hand, by employing onboard flight system 112, and not replacing it with a completely different system, the control system of the disclosed technique can easily be adapted to a wide range of drones, without having to redesign the drones themselves.

Figure 3:
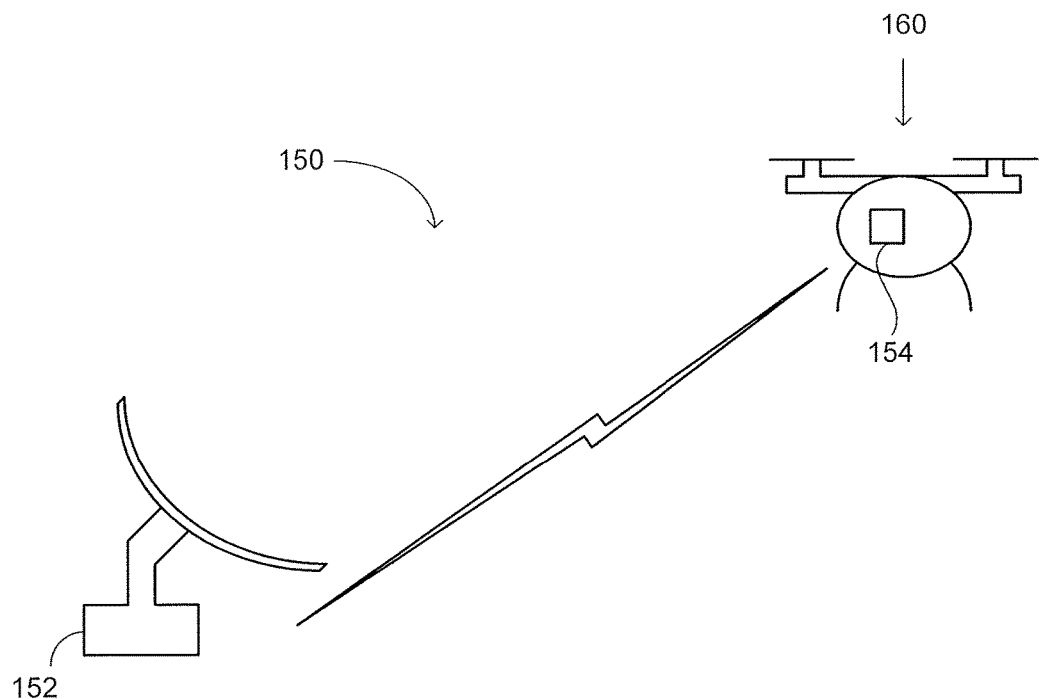
FIG. 3 is a schematic illustration of a drone control system, constructed and operative in accordance with another embodiment of the disclosed technique.

Reference is now made to FIG. 3, which is a schematic illustration of a drone control system, generally referenced 150, constructed and operative in accordance with another embodiment of the disclosed technique. Drone control system 150 includes a remote sensor 152 and an interface 154. Remote sensor 152 is coupled with interface 154, which is further coupled with drone 160 (e.g., with an onboard flight system of drone 160). Remote sensor 152 determines the relative position of drone 160. Interface 154 produces pseudo-GPS signal indicating the absolute position of drone 160 in real-time, according to the position data provided by remote sensor 152. Interface 154 provides the pseudo-GPS signal to drone 160 in real-time. The onboard flight system of drone 160 tracks the position of drone 160 by merging the highly accurate pseudo-GPS signal, with inertial tracking data.

In accordance with an alternative embodiment of the disclosed technique, a processing component coupled with remote sensor 152 determines the absolute position of drone 160 from the relative position determined by remote sensor 152. The processing component can further produce the pseudo-GPS signal, and send the pseudo-GPS signal to interface 154. In this case, interface 154, merely provides the pseudo-GPS signal into the onboard flight system.

Figure 4:
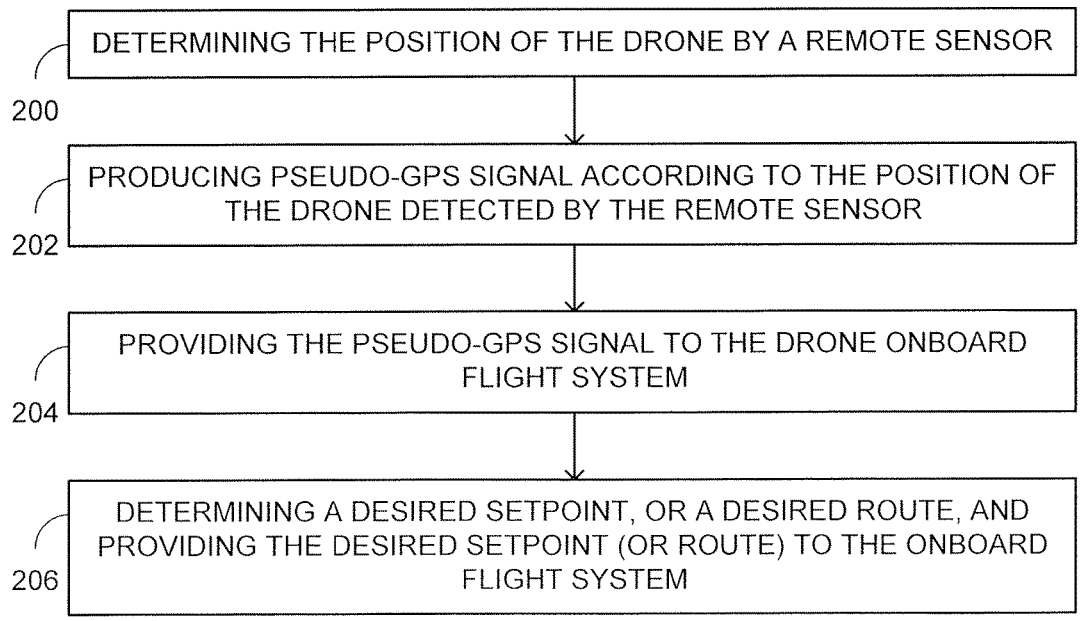
FIG. 4 is a schematic illustration of a drone control method, operative in accordance with a further embodiment of the disclosed technique.

Reference is now made to FIG. 4, which is a schematic illustration of a drone control method, operative in accordance with a further embodiment of the disclosed technique. In procedure 200, the position of the drone is determined by a remote sensor. The remote sensor can be any sensor (or a group of sensors) for detecting the position of the drone, such as a radar, a set of cameras, a set of ultrasonic transceivers, a theodolite, and the like. The remote sensor may employ a dedicated onboard marker, such as a metal slab, or a reflector. The remote sensor can be mounted on an immobile station, or on a vehicle (e.g., on a truck, an aircraft, or a ship). The remote sensor detects the position of the drone relative to the remote sensor itself (i.e., the relative position of the drone). Alternatively, the remote sensor can determine the absolute position of the drone, for example, according to the relative position and according to the absolute position of the remote sensor. With reference to FIG. 2, remote sensor 102 detects the position of drone 110.

In procedure 202, pseudo-GPS signal is produced according to the position of the drone detected by the remote sensor. The pseudo-GPS signal indicates the absolute position of the drone, and is in the format employed by a native onboard flight system of the drone. The pseudo-GPS signal is intended to replace GPS readings of a conventional onboard GPS sensor native to the drone. The accuracy of the pseudo-GPS signal exceeds the accuracy of the conventional onboard GPS sensor of drone, and thereby the positioning of the drone by the onboard flight system is improved. For example, the GPS readings of the conventional onboard GPS signal provide the absolute position with an accuracy of a few meters, and the pseudo-GPS signal indicates the absolute position of the drone with an accuracy of a few centimeters. With reference to FIG. 2, interface 104 produces the pseudo-GPS signal.

In procedure 204, the pseudo-GPS signal is provided to the drone onboard flight system via an interface mounted onboard the drone. That is, the pseudo-GPS signal replaces GPS readings of an onboard GPS sensor, but otherwise the operation of the onboard flight system remains the same, and is not changed. The drone onboard flight system merges the pseudo-GPS signal with inertial tracking data obtained by an onboard IMU, and tracks the position of the drone. The system and method of the disclosed technique, improve the positioning of the drone, without replacing or modifying the native flight system, and can thus be employed for controlling various drones and other autonomous vehicles. With reference to FIG. 2, interface 104 provides the pseudo-GPS signal (replacing GPS readings of an onboard GPS sensor) into the onboard flight system.

In procedure 206, a desired setpoint, or a desired route, is determined and is provided to the onboard flight system. The interface determines (or receives from a controller located remotely from the drone) the setpoint or route, according to user input, or automatically for achieving a predefined goal. The onboard flight system flies the drone to the desired setpoint, or along the desired route, according to the drone position determined by merging the inertial tracking data with the pseudo-GPS signal. Thereby, the drone is positioned with great accuracy resulting from the high accuracy of the position detection performed by the remote sensor. With reference to FIG. 2, interface 104 determines a desired setpoint for drone 110 to hover in. Interface 104 provides the desired setpoint to onboard flight system 112. Onboard flight system 112 flies drone 110 to the desired setpoint, and maintains drone 110 at the desired setpoint according to the drone position determined by merging the inertial tracking data with the pseudo-GPS signal.

In the examples set forth herein above, the autonomous vehicle is a drone. Alternatively, other autonomous vehicles can be controlled, such as an autonomous submarine, seacraft, landcraft, aircraft and spacecraft. It will be appreciated by persons skilled in the art that the disclosed technique is not limited to what has been particularly shown and described hereinabove. Rather the scope of the disclosed technique is defined only by the claims, which follow.

The invention claimed is:

1. A drone control system for controlling a drone, said drone including an onboard flight system, said onboard flight system being previously configured to receive navigational data in a format compliant with a standard navigational data transmission protocol, said system comprising:

a remote sensor located remotely from the drone and configured to determine position data of said drone relative to said remote sensor and to provide said position data to said drone; and an interface coupled with said remote sensor, said interface replacing a conventional onboard GPS sensor, said interface being configured to receive said position data from said remote sensor, said interface further being configured to produce a pseudo GPS signal from said position data, said pseudo GPS signal replacing a GPS signal which would have been produced by a conventional onboard GPS sensor, said pseudo GPS signal indicating the position of the drone, and said interface further being configured to provide said pseudo GPS signal to an onboard flight system of the drone, the format of said pseudo GPS signal being fully compliant with said standard navigational data transmission protocol employed by said onboard flight system, wherein said onboard flight system is configured to receive inertial tracking data and said pseudo GPS signal, said onboard flight system being further configured to track the position of the drone by merging said inertial tracking data and said pseudo GPS signal and to navigate said drone accordingly, said onboard flight system receives the inertial tracking data from an onboard inertial measuring unit of said drone.

2. The drone control system according to claim 1, wherein said onboard flight system is the native onboard flight system of said drone.

3. The drone control system according to claim 1, wherein the accuracy of the position determined by said remote sensor exceeds the accuracy of the position determined by a drone onboard GPS sensor.

4. The drone control system according to claim 1, wherein said interface is further configured to determine an absolute position of said drone according to relative position data determined by said remote sensor and according to an absolute position of said remote sensor.

5. The drone control system according to claim 1, wherein said interface is further configured to provide a desired set point to said drone onboard flight system.

6. The drone control system according to claim 1, wherein said remote sensor is mounted on a vehicle.

7. The drone control system of claim 6, wherein the absolute position of said remote sensor is determined by an absolute position sensor mounted on said vehicle.

8. A drone control method for controlling a drone, comprising the following procedures:
   determining a position of said drone by a remote sensor;
   producing pseudo-GPS signal according to said position of said drone detected by said remote sensor; and
   providing said pseudo-GPS signal to said drone onboard flight system via an interface.

9. The drone control method according claim 8, wherein the accuracy of the position determined by said remote sensor exceeds the accuracy of the position determined by a drone onboard GPS sensor.

10. The drone control method according to claim 8, further comprising determining an absolute position of said drone according to relative position data determined by said remote sensor and according to an absolute position of said remote sensor; and
   wherein the procedure of producing said pseudo-GPS signal is performed according to said absolute position of the drone.

11. The drone control method according claim 8, further comprising determining a desired setpoint, and providing the desired setpoint to said onboard flight system via the interface.

* * * * *